455-603  AU 233  EX
7/19/83  XR  4,394,691

United States Patent [19]
Amano et al.

[11] 4,394,691
[45] Jul. 19, 1983

[54] REMOTE CONTROL SYSTEM

[75] Inventors: Toshio Amano, Tokyo; Kunio Nagai; Juri Honma, both of Yokohama, all of Japan

[73] Assignee: Sony Corporation, Tokyo, Japan

[21] Appl. No.: 288,517

[22] Filed: Jul. 30, 1981

[30] Foreign Application Priority Data

Aug. 8, 1980 [JP] Japan .................. 55-113240[U]

[51] Int. Cl.³ ............................................. H04N 5/44
[52] U.S. Cl. .............................. 358/194.1; 455/603
[58] Field of Search ................... 358/194.1; 455/603

[56] References Cited
U.S. PATENT DOCUMENTS 4,337,480  6/1982  Buurassin et al. ............ 358/194.1
4,338,632  7/1982  Falater ......................... 358/194.1

*Primary Examiner*—Richard Murray
*Attorney, Agent, or Firm*—Lewis H. Eslinger; Alvin Sinderbrand

[57] ABSTRACT

A remote control system capable of selectively controlling a desired one of plural devices in response to the transmission of remote control signals from a transmitter. A central control includes a decoder decoding a remote control signal so as to produce a corresponding device control signal, this device control signal being coupled to the plural devices so as to control a desired one thereof in accordance with the decoded signal. The central control includes at least one, and preferably plural, input terminals. Plural receiving elements, spatially separated from each other, are coupled to respective ones of the input terminals, preferably by a conducting lead, and, preferably, a receiving element is provided directly at the central control. The receiving elements are capable of receiving a remote control signal transmitted, for example, by infrared transmission, from the transmitter. A combining circuit, such as an OR-type circuit, in the central control is coupled to the respective input terminals and also to the one receiving element which may be disposed directly at the central control, so as to supply a remote control signal received by any of the receiving elements to the decoder. Hence, a desired device is controlled regardless of the particular receiving element to which the remote control signal is transmitted.

12 Claims, 4 Drawing Figures

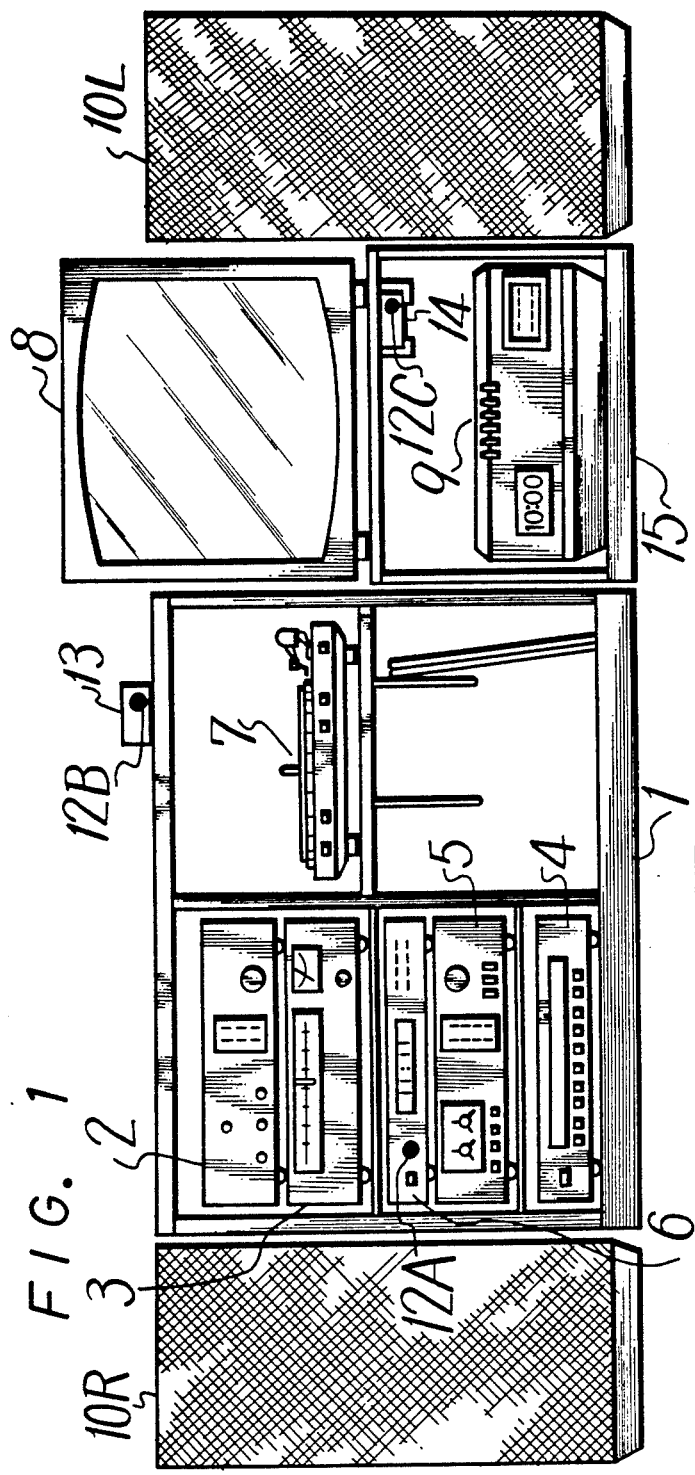
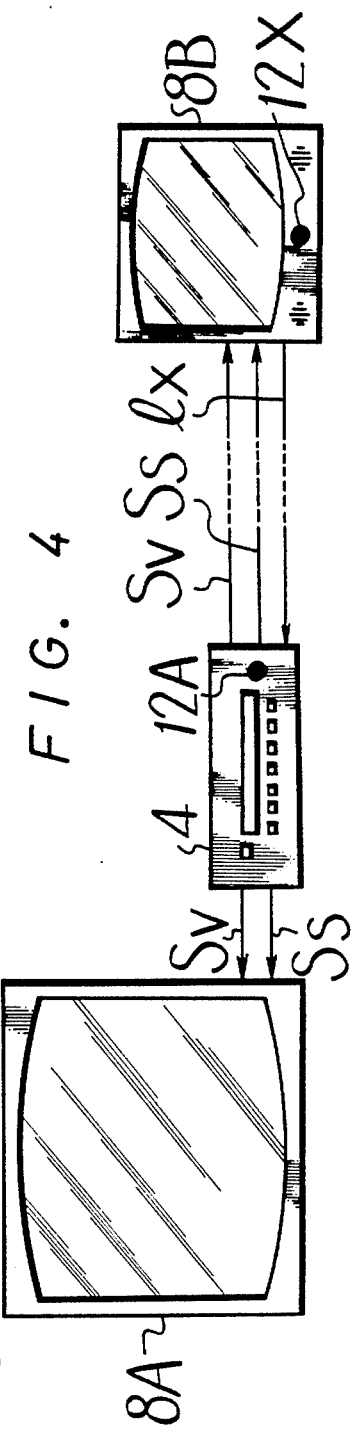

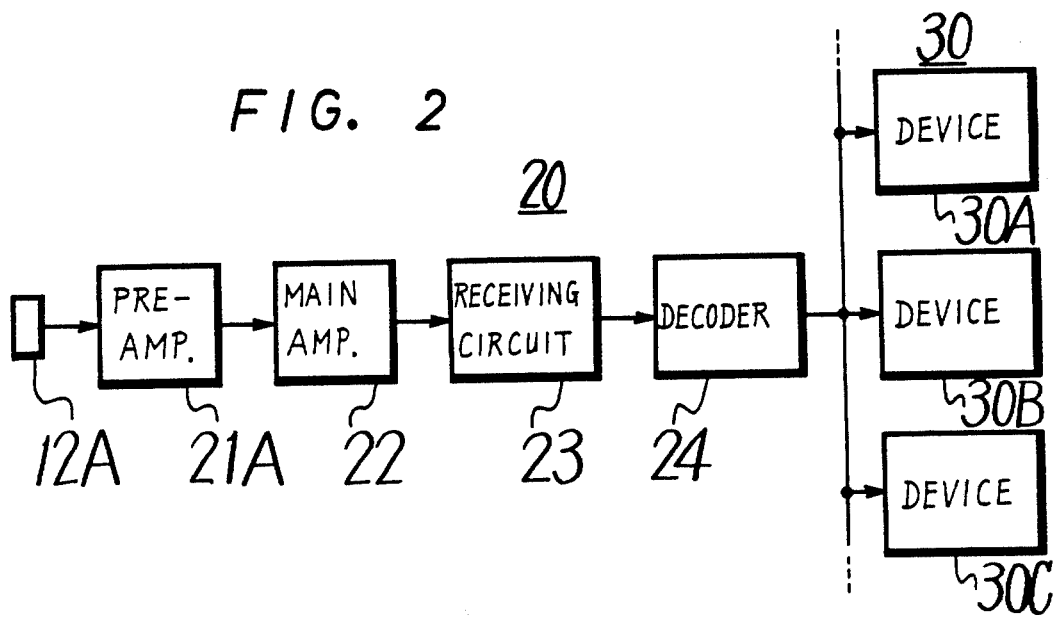
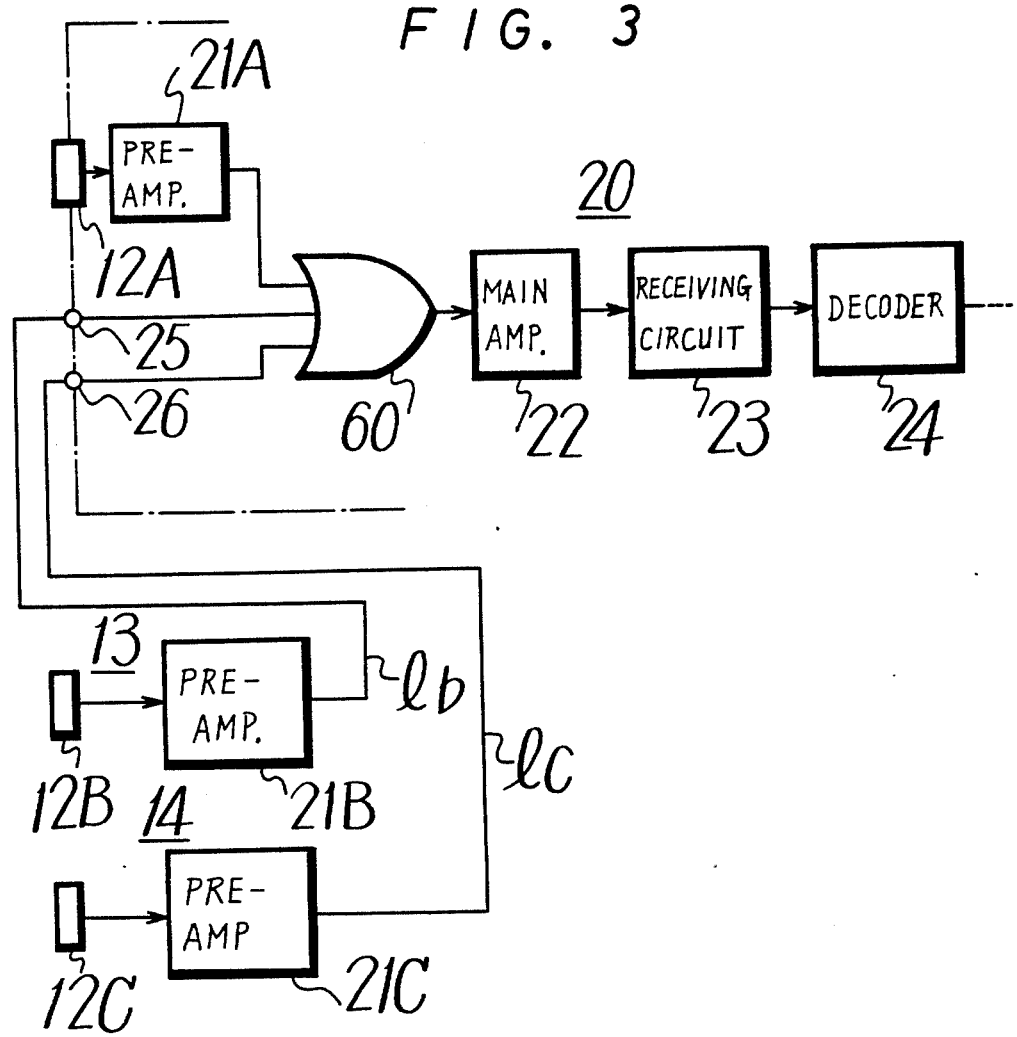

REMOTE CONTROL SYSTEM

BACKGROUND OF THE INVENTION

This invention relates to a remote control system and, more particularly, to such a system wherein any desired one of plural devices may be controlled by the transmission of a remote control signal to any one of plural, spatially separated receiving elements. The present invention is particularly advantageous for use in a remote control system wherein the remote control signal is transmitted with relatively high directivity.

It now is common in so-called home entertainment systems to provide control circuitry by which a user of that system may control particular home entertainment devices included therein. For example, a typical home entertainment system may include a television receiver, a video tape recorder (VTR), a cassette recorder, a radio tuner, an audio amplifier, a phonograph turntable, and the like. Selective ones, or all of these devices preferably are controlled by the user from a remote location. For example, such devices may be turned ON or OFF, volume may be adjusted, channel or broadcast station may be selected, particular portions of a prerecorded tape or a phonograph record may be reproduced, and the like. Such functions are achieved by transmitting a command signal from a transmitter unit to a central control for the devices. The command signal may be a coded signal and may modulate an ultrasonic carrier, a radio wave carrier, or the like, for transmission from the transmitter unit to the central control. At the central control, the modulated signal is received and decoded to produce a corresponding control signal. Hence, depending upon the particular control signal which had been encoded, a desired one of the controllable devices may be turned ON or OFF, and a particular function thereof may be selectively controlled, as mentioned above.

Desirably, the remotely transmitted control signal exhibits relatively high directivity. This is advantageous in order to avoid false triggering or actuation of the central control by spurious signals. One type of carrier which exhibits desirably high directivity is an infrared carrier. In one remote control system of the aforementioned type, although plural devices may be controlled, the central control generally is provided with only a single receiving element. While the desired device may be suitably controlled when the encoded, infrared remote control signal is transmitted to the receiving element, the user often directs his transmitter toward the particular device which he wishes to control. Hence, because of the desirably high directivity of the remote control signal, this signal is not received at the receiving element. Consequently, the device which the user wishes to control is not controlled. Because of this, the user often is of the mistaken belief that either his command transmitter, or the central control, or the particular device which he wishes to control is in disrepair.

This mis-direction of the transmitted remote control signal occurs frequently in a system having master and remote television receivers, both of which are controlled by a common television tuner. In this arrangement, the receiving element usually is provided directly at the common television tuner. Hence, when this master/remote television receiver system is desired to be operated by the user, the remote control signal must be transmitted to the receiving element at the common television tuner. It is not unusual, however, for the user to direct the transmitted remote control signal to the master or to the remote television receiver which, of course, fails to operate in the manner which he desires.

OBJECTS OF THE INVENTION

Accordingly, it is an object of the present invention to provide an improved remote control system which avoids the aforenoted disadvantages.

Another object of this invention is to provide a remote control system wherein a desired one of plural devices may be remotely controlled by transmitting a remote control signal to the particular device which is to be controlled.

A further object of this invention is to provide a remote control system of the aforementioned type wherein a remote control signal receiving element is provided in the vicinity of those devices which are to be controlled.

An additional object of this invention is to provide a remote control system of the aforementioned type in which a central control is coupled, as by conductive leads, to the receiving elements which may be spatially separated from each other, whereby a remote control signal received at any one of such receiving elements is coupled to the central control which then may supply an appropriate control signal to the desired device.

Yet another object of this invention is to provide a remote control system wherein the plurality of remote control signal receiving elements are spatially separated from each other, each being adapted to receive a remote control signal, whereby a particular device may be selectively controlled regardless of the particular receiving element to which the remote control signal is transmitted.

Various other objects, advantages and features of the present invention will become readily apparent from the ensuing detailed description, and the novel features will be particularly pointed in the appended claims.

SUMMARY OF THE INVENTION

In accordance with this invention, a remote control system is provided for selectively controlling a desired one of plural devices by the remote transmission of control signals from a transmitter. Preferably, the transmitter is a single, common transmitter capable of transmitting a relatively highly directive encoded signal. A central control includes a decoder for decoding a remote control signal so as to produce a corresponding device control signal. The central control is coupled to the plural devices and applies the device control signal to the proper device. The central control includes one, and preferably plural, input terminals. Plural receiving elements spatially separated from each other are adapted to receive the remote control signal transmitted to any one of them by the transmitter. In accordance with one desired aspect of this invention, the plural receiving elements are positioned in the vicinity of the particular devices which are to be controlled; and, preferably, one of the receiving elements is disposed directly at the central control. Those receiving elements which are remote from the central control are coupled to respective ones of the input terminals by, for example, conductive leads. Hence, the remote control signal which is received by any one of the receiving elements is applied to the central control. A combining circuit which, in accordance with another aspect of this invention, is an OR-type circuit, supplies the remote control signal received by any one of the receiving elements to the decoder.

In accordance with one feature of the present invention, the remote control signals are transmitted from the transmitter by modulating an infrared carrier with the encoded signal.

BRIEF DESCRIPTION OF THE DRAWINGS

The following detailed description, given by way of example, will best be understood in conjunction with the accompanying drawings in which:

FIG. 1 is a diagrammatic representation of a home entertainment system wherein the present invention finds ready application;

FIG. 2 is a block diagram of a typical remote control system which suffers from the aforenoted disadvantages;

FIG. 3 is a block diagram of a preferred embodiment of the present invention; and FIG. 4 is a diagrammatic representation of a particular use of the present invention in a master/remote television system.

DETAILED DESCRIPTION OF A PREFERRED EMBODIMENT

Referring now to FIG. 1, there is illustrated one embodiment of a home entertainment system wherein the remote control system of the present invention finds ready application. The home entertainment system is provided with plural devices, each of which is adapted to be remotely controlled. For example, the home entertainment system may include both audio and video devices. The audio devices, which may be supported in a rack structure 1, may include an audio amplifier 2, including both a preamplifier and a main amplifier, a tuner 3, including both AM and FM tuning circuitry, a tape recorder 5, such as a so-called cassette deck, for recording audio signals and for reproducing previously recorded audio signals, and a phonograph record player 7. These devices may be interconnected in conventional manner. Furthermore, the home entertainment system also includes loudspeakers, such as left-channel and right-channel loudspeakers 10L and 10R, respectively, which loudspeakers may be coupled to the output of, for example, audio amplifier 2 so as to reproduce the audio sounds from the audio system.

The home entertainment system also includes a television receiver 8, a video tape recorder (VTR) 9 and a television tuner 4 which is adapted to receive and demodulate television signals and to supply the video signals to, for example, television receiver 8 and the audio signals to loudspeakers 10L and 10R. These audio signals which are demodulated from the received television signal may, if desired, be supplied to the loudspeakers via audio amplifier 2.

In one arrangement of the illustrated home entertainment system, select ones of the audio and video devices may be controlled from a remote location. In another embodiment, each audio and video device may be separately and remotely controlled. In this regard, a central control 6 is provided. This central control includes a receiving element 12A adapted to receive a remotely transmitted control signal, also referred to herein as a "remote control signal". In one embodiment, the remote control signal is transmitted from a common transmitter, this remote control signal being encoded so as to control a desired one of the audio and video devices and, moreover, to control a desired function of that device. Thus, and for example, the same transmitter may be used to turn television receiver 8 ON and OFF, to control VTR 9, to control radio tuner 3, to control cassette deck 5, to control phonograph record player 7, and the like. Such central controls are known to those of ordinary skill in the art, and a compatible transmitter which is capable of transmitting a suitably encoded control signal also is known. Desirably, the remote control signal which is transmitted by the remote transmitter modulates a carrier so as to exhibit desirably high directivity. That is, the area over which the transmitted remote control signal may be received is rather limited. For example, the remote control signal may modulate an ultrasonic carrier, an infrared carrier, or the like. When used in the present invention, the modulated carrier preferably is an infrared carrier.

When only a single receiving element 12A is provided on central control 6, it is appreciated that, because of the desirably high directivity of the remotely transmitted control signal, this control signal must be transmitted directly to the receiving element. Although an acceptable range of reception is present such that the remote control signal need not be directed precisely to the receiving element, the remote control signal will not be received and decoded if it is directed relatively far afield of receiving element 12A. Thus, even though the user may wish to control television receiver 8, he must direct his remote control signal to receiving element 12A. This generally requires the user to aim, or point, his transmitter at the receiving element. However, in many instances, if the user wishes to control television receiver 8, for example, he may direct his transmitter directly thereto. In general, the user may aim or point his transmitter directly at the particular device which he wishes to control. From the arrangement shown in FIG. 1, this generally has the undesired result of misdirecting the transmitted remote control signal such that it is not received at receiving element 12A. Hence, although the remote control system may be in proper operating condition, by mis-directing the transmitter in a manner so as to point it to the particular device which he wishes to control, rather than point it at central control 6, the user may mistakenly believe that his system is in disrepair.

To avoid this problem, the present invention provides additional receiving elements, schematically illustrated in FIG. 1 as, for example, receiving elements 12B and 12C, juxtaposed in the vicinity of those devices which the user may wish to control. For example, receiving element 12B is provided in a remote control receiver 13 in the vicinity of television receiver 8. Receiving element 12C is provided in a remote control receiver 14 in the vicinity of VTR 9. Consequently, if the user wishes to control television receiver 8, he need merely direct, or aim, his transmitter at remote control receiver 13. If the user wishes to control VTR 9, he need merely aim his transmitter at remote control receiver 14. Of course, the user may control either of these devices by aiming his transmitter at any one of receiving elements 12A, 12B and 12C.

In the embodiment shown in FIG. 1, additional receiving elements (not shown) may be provided in the vicinity, or directly on, additional ones of the devices which the user may wish to control. Thus, the natural operation of aiming the transmitter at the particular device which the user wishes to control will, in accordance with the present invention, effect proper control over that device.

Turning now to FIG. 2, there is illustrated a block diagram of a basic embodiment of a simple remote control system of the type wherein only a single receiving element, such as receiving element 12A, is provided. In particular, FIG. 2 illustrates the receiving section 20 of the remote control system. The transmitter, which is not shown, may be of known construction. Receiving section 20 is comprised of a preamplifier 21A, a main amplifier 22, a receiving circuit 23 and a decoder 24. Preamplifier 21A is coupled to receiving element 12A, the latter having been described hereinabove as being adapted to receive the remotely transmitted control signal. For example, if the remote control signal modulates an infrared carrier, receiving element 12A may be an infrared receiver or detector. This receiving element produces an electrical remote control signal in response to the received, encoded, infrared remote control signal.

The electrical remote control signal produced by the receiving element in response to the received remote control signal is amplified by preamplifier 21A and amplifier 22 and supplied to receiving circuit 23. This receiving circuit may be of known construction and supplies the remote control signal to decoder 24.

Decoder 24 is seen to be coupled to various ones of operating devices 30, these devices being illustrated as, for example, devices 30A, 30B and 30C. Each device may correspond to an audio or video device described above with respect to FIG. 1. Decoder 24 is adapted to decode the remote control signal supplied thereto so as to apply a device control signal to a selected one of devices 30. The encoded remote control signal may include, for example, an address portion identifying the particular device to which the device control signal is to be applied. The encoded remote control signal also may include a control function portion which serves to identify the particular function which is to be controlled in the addressed device. Decoder 24 thus supplies, to the addressed device, the appropriate device control signal, which control signal may be either an analog signal or a digital signal, as will be appreciated by those of ordinary skill in the art.

Hence, in accordance with the basic embodiment shown in FIG. 2, depending upon the encoded remote control signal that is transmitted to receiving element 12A, a selected one of devices 30A, 30B, 30C . . . is controlled to carry out a particular function, as commanded by the user of the system. The remote control signal may be transmitted either by a common transmitter unit which is selectively operated, or programmed, in a manner so as to select a corresponding one of devices 30 to be controlled or, alternatively, each of these devices may be associated with a respective transmitter unit, and the user may operate a particular transmitter unit to control the corresponding device.

A preferred embodiment of the receiving section 20 of the remote control system, in accordance with the present invention, is illustrated in FIG. 3. As before, the receiving section includes receiving element 12A, preamplifier 21A, main amplifier 22, receiving circuit 23 and decoder 24. It is assumed that these elements are provided at a central control, such as aforementioned central control 6. This central control may be separate and apart from each of the devices to be controlled thereby. This central control is schematically illustrated in FIG. 3 by the broken lines.

In this preferred embodiment, receiving section 20 also includes receiver units 13 and 14, shown in FIG. 1, these receiver units being provided with additional receiving elements 12B and 12C, respectively. As mentioned previously, receiver units 13 and 14 are positioned remotely from central control 6. Thus, receiving elements 12A, 12B and 12C are seen to be spatially separated from each other.

Receiver unit 13 also includes a preamplifier 21B which is coupled to receiving element 12B. Likewise, receiver unit 14 also includes a preamplifier 21C which is coupled to receiving element 12C. The arrangement between each receiving element and its associated preamplifier is similar to the interconnection between receiving element 12A and preamplifier 21A, described above with respect to the embodiment shown in FIG. 2.

Preamplifier 21B is coupled via a conductive lead $l_b$ to an input terminal 25 disposed on central control 6. Similarly, preamplifier 21C is coupled by a conductive lead $l_c$ to input terminal 26 which also is disposed on the central control. Although not shown herein, the central control may be provided with additional input terminals, each of which being adapted to be coupled by a conductive lead to a respective remotely disposed receiver unit.

In one embodiment, input terminals 25 and 26 may be formed as conventional jacks, and each of conductive leads $l_b$ and $l_c$ may terminate in a connector plug adapted to be removably inserted into a respective jack. Thus, if desired, other remote receiver units may be selectively connected to input terminal 25 or input terminal 26 in place of remote receiver units 13 and 14, respectively. Stated in general terms, central control 6 may be provided with n input terminals, and the remote control system may be provided with m remote receiver units, wherein n and m are integers which may or may not be equal to each other.

Preamplifier 21A, which preferably is included in central control 6, as well as input terminals 25 and 26 of the central control, all are coupled to respective inputs of an OR-type circuit 60. If the remote control signal produced at the output of each of preamplifiers 21A–21C is a digital-type signal, OR-type circuit 60 may comprise a conventional logical OR-gate. Alternatively, if the remote control signals produced at the output of preamplifiers 21A–21C are analog signals, OR-type circuit 60 may comprise a conventional analog OR-circuit. Thus, OR-type circuit 60 functions to transmit, or gate, the remote control signal received at any one of receiving elements 12A–12C and amplified by an associated one of preamplifiers 21A–21C to main amplifier 22.

From the embodiment shown in FIG. 3, it is appreciated that decoder 24 is supplied with the remote control signal that is received at any one of receiving elements 12A, 12B and 12C. Thus, regardless of the particular receiving element to which the remote control signal is transmitted, the desired device which is to be controlled, as determined by the contents of the remote control signal, will be supplied with the device control signal by the decoder. For example, and with reference to the arrangement shown in FIG. 1, if television receiver 8 is to be controlled, the user may aim his transmitter at receiver unit 13 so as to transmit an appropriate remote control signal to this receiver unit. Alternatively, the very same remote control signal may be transmitted to receiving element 12A, provided at central control 6, or to receiving element 12C included in receiver unit 14. Regardless of the particular receiving element which receives the remote control signal, OR-type circuit 60 supplies this remote control signal to decoder 24. Consequently, depending upon the contents of the remote control signal, this signal is decoded by the decoder and supplied to the desired one of devices 30.

In an alternative embodiment, amplifiers 21B and 21C may be included in central control 6. However, since the remote control signal produced by receiving elements 12B and 12C is relatively weak, this weak remote control signal may be subjected to undesired interference as it is transmitted to the preamplifiers via conductive leads $l_b$ and $l_c$.

It is appreciated that, although receiver units 13 and 14 and, particularly, receiving elements 12B and 12C, preferably are juxtaposed in the vicinity of the particular devices which are to be controlled, these receiver units may be positioned at any desired location, and may be remote from the particular device which is to be controlled. Advantageously, since a particular receiving element is adapted to receive the remote control signal which is intended to control any of the plural devices, rather than being dedicated to a single device, such receiving elements may be positioned at any desired locations.

Although central control 6 is illustrated as being separate and apart from the various devices to be controlled, it should be appreciated that, if desired, the central control may be integrated with, or provided in, any one of such remotely controllable devices.

Referring now to FIG. 4, there is illustrated a particular arrangement in which the present invention may be used. This arrangement is referred to as a master/remote television system and, as illustrated, includes a master television receiver 8A, a remote television receiver 8B and a common television tuner 4. Master television receiver 8A may include only the video components of a conventional television receiver; the audio components thereof may be replaced by, for example, an audio amplifier and audio loudspeakers, such as amplifier 2 and loudspeakers 10L and 10R, shown in FIG. 1. Alternatively, master television receiver 8A may include the usual audio components of a conventional television receiver.

Remote television receiver 8B, also referred to as a monitor television receiver, preferably includes a loudspeaker therein. Both television receivers 8A and 8B are coupled to television tuner 4 and are adapted to receive video and audio signals $S_V$ and $S_S$, respectively, from the television tuner. It may be appreciated that television tuner 4 is adapted to be tuned to any desired television channel, and the video and audio program information received on that television channel is supplied to both master television receiver 8A and remote television receiver 8B.

Desirably, the master/remote television system illustrated in FIG. 4 is remotely controllable. To this effect, television tuner 4 is provided with receiving element 12A, which may be of the type described above and shown in FIGS. 2 and 3, and remote television receiver 8B is provided with receiving element 12X. This receiving element 12X may be of the type shown in FIG. 3, such as receiving elements 12B and 12C. Receiving element 12X may be connected to a preamplifier (not shown) which, in turn, is coupled via conductive lead $l_x$ to the central control which, in the embodiment shown in FIG. 4, is included in television tuner 4. This central control may be of the type shown in FIG. 3, wherein conductive lead $l_x$ may be used in addition to, or in place of, conductive leads $l_b$ and $l_c$. Thus, when a remote control signal is transmitted either to receiving element 12A or to receiving element 12X, this remote control signal is supplied to decoder 24, in the manner discussed above with respect to FIG. 3. Consequently, television tuner 4 may be appropriately controlled to be turned ON or OFF, to select a desired channel, to adjust the audio volume, and the like. Furthermore, one or the other, or both, of master television receiver 8A and remote television receiver 8B may be selected, or switched, in accordance with the remotely transmitted control signal. Thus, a viewer who is positioned at a remote location may transmit an appropriate remote control signal to receiving element 12A or to receiving element 12X, whereby the master television receiver is turned ON, or the remote television receiver is turned ON, and the particular television receiver which is energized then may be suitably controlled from the user's remote location. For example, if television tuner 4 is positioned near, or provided in, master television receiver 8A, the operation of remote television receiver 8B nevertheless can be controlled by the user merely by transmitting the appropriate remote control signals to receiving element 12X.

It will be appreciated that the master/remote television system shown in FIG. 4 may be replaced by a similar master/remote audio system of the type wherein audio loudspeakers are disposed at different locations, and the "master" speakers as well as the "remote" speakers may be selectively enabled or disabled from a remote location merely by transmitting the appropriate remote control signal to one or the other of the spatially separated receiving elements.

While the present invention has been particularly shown and described with reference to preferred embodiments, it will be readily appreciated by those of ordinary skill in the art that various changes and modifications in form and details may be made without departing from the spirit and scope of the invention. For example, the encoded remote control signal may be transmitted by modulating other suitable carriers. Furthermore, the relative directivity of the remotely transmitted control signal may be relatively high, so as to require relatively accurate transmission of the remote control signal directed to a particular receiving element, or may be relatively low so as to permit the user to aim his transmitter merely in the general direction of a receiving element. Furthermore, an additional number of input terminals and corresponding remote receiver units coupled thereto may be provided in central control 6 as well as in television tuner 4, depending upon the number of controllable devices with which the present invention is to be used. Still other alternative embodiments have been described and suggested above.

It is, therefore, intended that the appended claims be interpreted as including the foregoing as well as various other changes and modifications.

What is claimed is:

1. A remote control system for selectively controlling a desired one of plural devices by the remote transmission of control signals from a transmitter, said system comprising:

central control means including decoding means for decoding a remotely transmitted control signal to produce a corresponding device control signal, said central control means being coupled to said plural devices for controlling said desired device with said device control signal;

plural receiving means spatially separated from each other, each receiving means receiving said remotely transmitted control signal;

at least one input terminal provided on said central control means, said at least one input terminal being coupled to one of said receiving means for receiving a remotely transmitted control signal therefrom; and means for supplying the remotely transmitted control signal received at said at least one input terminal to said decoding means, whereby a desired device is controlled in response to a remotely transmitted control signal received by said receiving means coupled to said at least one input terminal.

2. The system of claim 1 wherein one of said plural receiving means is provided at said central control means.

3. The system of claim 2, further comprising a respective amplifier means coupled to each of said plural receiving means for amplifying the remotely transmitted control signal received thereby.

4. The system of claim 3 wherein the amplifier means coupled to the receiving means provided at said central control means is coupled to said means for supplying, and said amplifier means coupled to the remaining receiving means is coupled to said at least one input terminal.

5. The system of claim 1 wherein selected ones of said plural receiving means are juxtaposed in the vicinity of said devices for receiving a remotely transmitted control signal directed to a respective one of said devices.

6. The system of claim 1 wherein said central control means is separate and apart from said selectively controlled devices.

7. The system of claim 1 wherein said means for supplying the remotely transmitted control signal to said decoding means comprises OR circuit means having inputs coupled to at least said input terminals.

8. The system of claim 1 wherein said remotely transmitted control signal is a modulated infrared signal; and each receiving means includes an infrared detector.

9. The system of claim 1 wherein said transmitter is a common transmitter actuable to generate different control signals for controlling each of said devices.

10. The system of claim 1 wherein said plural devices include master and remote television receivers and a common television tuner coupled thereto, said central control means being disposed at said common television tuner and having a receiving means thereon; and said remote television receiver being provided with a receiving means coupled to a respective input terminal.

11. A remote control system for selectively controlling a desired one of plural devices by the remote transmission of control signals from a transmitter, said system comprising:

central control means including decoding means for decoding a remote control signal to produce a corresponding device control signal, said central control means being coupled to said plural devices for applying said device control signal thereto, said central control means further including plural input terminals;

plural receiving means spatially separated from each other, each for receiving a remote control signal transmitted by said transmitter, one of said receiving means being disposed at said central control means and at least one other of said receiving means being positioned in the vicinity of a respective device;

connecting means for connecting said at least one other receiving means to an input terminal of said central control means to apply a remote control signal received by said at least one other receiving means to said central control means; and means included in said central control means and coupled to said plural input terminals and also to said one receiving means disposed at said central control means for supplying a remote control signal received by a selected one of said one receiving means and said at least one other receiving means to said decoding means; whereby a device control signal is applied to a desired device notwithstanding the particular receiving means to which said remote control signal is transmitted.

12. The system of claim 11 wherein each of said receiving means includes an amplifier for amplifying the remote control signal received thereby.

* * * * *